United States Patent [19]

Hiromae et al.

[11] 4,288,492

[45] Sep. 8, 1981

[54] INSULATING COATING COMPOSITIONS APPLIED ON ELECTRICAL STEEL SHEETS

[75] Inventors: Yoshitaka Hiromae, Kitayushu; Kazuo Nakamura, Munakata; Toshiya Wada; Hirotada Katoh, both of Kitakyushu, all of Japan

[73] Assignee: Nippon Steel Corporation, Tokyo, Japan

[21] Appl. No.: 118,589

[22] Filed: Feb. 4, 1980

Related U.S. Application Data

[63] Continuation of Ser. No. 853,465, Nov. 21, 1977, abandoned, which is a continuation of Ser. No. 658,875, Feb. 18, 1976, abandoned.

[30] Foreign Application Priority Data

Feb. 25, 1975 [JP] Japan ................................ 50-23025

[51] Int. Cl.[3] ........................ B32B 15/08; B32B 27/38

[52] U.S. Cl. .................................... 428/336; 336/219; 427/44; 427/54.1; 427/129; 427/130; 428/418; 428/425.5; 428/425.8; 428/439; 428/447; 428/450; 428/457; 428/458; 260/37 SB; 260/37 EP; 260/37 N; 260/39 SB

[58] Field of Search ............... 428/418, 423, 450, 457, 428/458, 474, 538, 539, 425.5, 425.8, 447, 336, 339; 252/63.5, 63.7; 148/113, 31.5, 112, 31.55; 427/44, 54, 104, 126.1, 126.3, 129, 127, 128, 130; 336/219, 234, DIG. 4; 174/110 SR, 110 E, 110 S, 110 A

[56] References Cited

U.S. PATENT DOCUMENTS

| | | | |
|---|---|---|---|
| 1,924,311 | 8/1933 | Frey | 427/104 X |
| 3,666,568 | 6/1970 | Shimanaka | 427/104 X |
| 3,840,448 | 10/1974 | Osborn et al. | 204/159.14 |
| 3,924,022 | 12/1975 | Schroeter et al. | 427/54.1 |
| 3,945,862 | 3/1976 | Lee et al. | 148/31.5 |
| 3,947,373 | 3/1976 | Sobajima et al. | 252/63.5 X |
| 3,970,535 | 7/1976 | McGinniss | 204/159.18 |
| 3,976,553 | 8/1976 | Larsen | 204/159.22 |
| 3,979,270 | 9/1976 | Trecker et al. | 204/159.14 |
| 3,979,426 | 9/1976 | Demajistre | 204/159.22 X |
| 4,071,425 | 1/1978 | Guarino et al. | 204/159.24 |

*Primary Examiner*—Ronald H. Smith
*Assistant Examiner*—Thurman K. Page
*Attorney, Agent, or Firm*—Toren, McGeady and Stanger

[57] ABSTRACT

A coating composition including inorganic compounds dispersed in an organic material capable upon exposure to UV rays or electron beams of producing an adherent insulating film of high dielectric properties on the surfaces of electro-sheets of ferrous material. The coated electro-sheets are annealed after the forming, for example, cutting or punching operation in order to remove thereby imparted stresses without impairing the dielectric properties.

6 Claims, No Drawings

INSULATING COATING COMPOSITIONS APPLIED ON ELECTRICAL STEEL SHEETS

This is a continuation of application Ser. No. 853,465, filed on Nov. 21, 1977, now abandoned, which, in turn, was a continuation of application Ser. No. 658,875 filed on Feb. 18, 1976, now abandoned.

This invention relates to insulating coatings to be applied on the surfaces of electrical steel sheets for use in the form of cores of electrical instruments such as motors and transformers, and a method of producing the same.

Electrical steel sheets, for example, silicon steel sheet and the like which are to be cut or punched into laminations and stacked into cores for use in electrical motors commonly have on their surfaces an insulating coating which functions to reduce the Watts losses due to the eddy current losses of the cores. At the recent time, such an insulating coating is produced from two different kinds of materials in the separate form from each other, namely, the inorganic type coating and the organic type coating, depending upon the application of electrical steel sheets. The present invention is concerned with the organic type insulating coating, and it is characterized by the combination of a synthetic resin to be cured by ultra violet (UV) rays or electron beams (EB), contained inorganic compounds which impart good heat-resistance and high dielectric properties to a resultant adherent film on the surfaces of electrical steel sheets.

As the essential component of a coating composition from which an adherent film of the organic type is formed, the prior art has so far made use of water-soluble polymers, latex polymers and solvent type polymers. The use of such polymers, however, introduces more or less disadvantages to the coating process and the coated products. For example, the coating composition containing a water-soluble polymer or latex polymer after applied to the surfaces of the electrical steel sheets must be heated to evaporate a large amount of water, thereby resulting in large consumption of energy. Further, the resultant insulating film produced by the water-soluble polymer or latex polymer has so large a water-permeability that the steel substrate is very susceptible to rust. In the case of the solvent type polymers, the curing of the as-formed coating is accompanied by large emergence of solvent into air which is undesirable from the point of view of environmental pollution. This becomes very serious particularly where the coating operation is performed on the same line as that of production of electrical steel sheets or strips in a steelmaking plant where the frequency of application of heat to the material is so high that the provision for fire prevention must be made.

The present inventors have made various attempts to eliminate the above mentioned conventional drawbacks of the organic type insulating coating, and have now found that these problems can be overcome by using polymers capable, upon exposure to UV rays or electron beams, of being cured. The cured insulating film made of the UV-curing or EB-curing polymer alone, however, has not adequate dielectric properties. Therefore, the present inventors contemplate the use of inorganic compounds having good heat-resistance and high dielectric insulation as dispersed in the UV-curing or EB-curing polymer-based coating system in order to impart thereto high dielectric properties.

Accordingly, an object of the present invention is to provide an improved composition for insulating coatings having high dielectric properties on the surfaces of electrical steel sheets.

Another object of the invention is to provide an insulating coating composition of the UV-curing or EB-curing polymer-based system which, when set out as an adherent coating on the electro-sheet surface, does not operate as a source of environmental pollution or fire with large consumption of energy which may be often encountered in the prior art using water-soluble polymers, latex polymers and solvent type polymers as the essential component of the insulating coating.

Another object of the invention is to provide an electrical steel sheet carrying on its surfaces an insulating film having high dielectric properties and which after punched into laminations and stacked into cores for use in electric motors, for example, may be annealed at a temperature of 700 to 800° C. for a period of time sufficient to relieve previously imparted stresses from the cores without imparting the magnetic properties thereof.

Exemplification of inorganic compounds, which may be used to impart to the resultant adherent insulating film the desired heat-resisting and dielectric properties and to preserve these properties during subsequent treating operations such as the stress-relief annealing, are oxides, phosphates, silicates, carbonates and sulfates of Li, Na, Mg, Al, Si, K, Ca, Ti, V, Cr, Fe, Co, Ni, Cu, Zn, Mo, Sn and W. Of these, the preferable one is silicates such as talc ($Mg_3Si_4O_{10}(OH)_2$), mica ($KAl_3Si_4O_{10}(OH)_2$) and kaolinite ($Al_2O_3.2SiO_2.2H_2O$). These inorganic compounds may be added either singly or in a combined form of two or more compounds. It has been found that the desired results are obtained in the concentration of the inorganic compound or compounds from 10 to 90% by weight of the insulating film. In the lower limit, it is difficult to impart to the insulating film an acceptable heat resistance. In the upper limit, the strength of adhesion of the insulating film on the electrical sheet becomes so low that the film is liable to peel off or disrupt from the electrical sheets. For getting an adequate heat resistance, it is preferred to adjust it to not lower than 30%. For facilitating the coating operation with a controlled viscosity of the coating composition, it is preferred to adjust it to not more than 60%. Further, by taking into account the punchability of the organic type insulating film as commonly utilized in the art, it is preferred to select these inorganic compounds having a hardness in Mohs scale of not higher than 5, as the steel material for the electrical steel sheets has a hardness equal to 5 in Mohs scale or less.

Although the insulating film containing the above identified inorganic compound retains as excellent dielectric properties after the application of stress relief annealing thereto as before, it is preferred to add an additional inorganic compound or compounds selected from the group consisting of boric acid and borates in an amount of 1 to 50% by weight based on the total weight of the above-defined inorganic compounds added to, thereby further improving the strength of adhesion of an insulating film to the steel sheet material which has been subjected to the stress relief annealing. The addition of boric acid and/or borates in excess of this range does not lead to any marked improvement in heat resistance and adhesiveness of the insulating film, and will make more complicate the handling. The optimum range is from 10 to 30%.

Exemplification of UV rays-curable or EB-curable polymers which may be used in the invention are commercially available polymers at the present time such as those produced by reacting an organic compound having unsaturated double bonds, namely, acrylic acid or methacrylic acid with epoxy resins, polyether resins, polyester resins, siliconic resins and urethanic resins for example. Of these, the practically preferable polymers are those produced from epoxy resins, polyester resins and siliconic resins. When only UV rays are employed to cure the as-applied coating, a photo initiator is added along with these acrylated resins namely, acrylated epoxy resins, acrylated polyether resins, acrylated polyester resins, acrylated siliconic resins and acrylated urethanic resins to produce very reactive free radicals capable upon exposure to ultra violet rays having a wave-length of 200 to 400 millimicrons. These reactive free radicals, in turn, causes further polymerization of the resin at the unsaturated double bonds thereof. As examples of the photo initiator usable in the invention, mention may be made of benzoindiphenyl disulfide, benzoyl peroxide, benzophenone and benzoinbutyl ether. The concentration of the photo initiator is in a range of from 1 to 10%, preferably 3 to 5%, by weight based on the total weight of the UV-curable polymer used. When the curing of the coating is performed by use of an electron beam, there is no need to use such photo initiator, provided that the organic base of the coating is reactive with the electron beam. For facilitating the application of the coating to the electrical sheet, it is desirable to control the viscosity of the coating composition to not higher than 5,000 c.p.s. (25° C.) by adding thereto cross-linking acrylate compound having unsaturated double bonds and having a molecular weight of less than 400. As examples of the viscosity-controlling organic compound mention may be made of hydroxyethyl acrylate, ethylene glycol dimethacrylate, hydroxypropyl acrylate, trimethylolpropane triacrylate, neopentyl glycol diacrylate and hexanediol diacrylate. Most of the cross-linking acrylates having molecular weights of more than 400 lack an effective viscosity-controlling function. The upper limit of an acceptable range of contents of the viscosity-controlling organic compound in the coating composition is 80% by weight based on the weight of the curable polymer.

The thickness of an adherent insulating film applied and cured on the electrical sheet material is controlled to be less than 10 microns. This is because the slope of increase in the interlayer resistance or dielectric insulation of the adherent insulating film on the electrical steel sheet is rapidly decreased with increase in the thickness of the insulating film from 10 microns. Moreover, increased film thicknesses result in a core that has decreasing space factors. In this respect, it is desirable to decrease the film thickness to as thin as possible.

In the practice of the present invention, where electrical steel sheets containing not more than 3.5% Si and having a thickness of not larger than 1 mm and usually 0.3 to 0.5 mm are produced with the insulating film applied thereon, it has been found possible and beneficial to apply the insulating film in a final step of a process for producing the silicon steel sheets from steel materials. A typical example of such a process commonly employed at the present time comprises the steps of; adjusting the concentrations of the various components of a molten iron supplied from a smelting source to the respective compositional ranges, producing slabs from the molten iron by ingot casting or continuous casting, hot rolling the slab into a plate having a thickness of 2 to 3 mm, pickling the plate in an acid solution, cold rolling the pickled plate into a sheet having a final thickness, in this instance, of 0.3 to 0.5 mm, and finally applying a continuous annealing to the sheet to relieve the stress and stabilize the magnetic properties of the sheet material. After this continuous annealing, an insulating coating composition of the present invention is applied to the surfaces of the sheet. From the standpoint of the maintenance of a high production efficiency, it is preferred to perform this application of the insulating film to the sheet on the same line as that of production of the silicon steel sheet just after the continuous annealing operation. In some cases, however, the present invention may be operated in a separate line from that of the continuous annealing.

In applying the insulating coating of the invention to the silicon steel sheet, it is possible to employ any one of conventional means, such as roll coater, spraying, dipping, curtain-flowing, electro-static coating and the like. The steel sheet carrying on its surface the viscous coating is transferred from the coating unit to a curing unit provided either with an ultra violet ray radiating source capable of emissioning a wavelength of 200 to 400 milli-microns such as a mercury lamp, xenon lamp or arc lamp or with an electron beam source such as a scanned electron beam system, beta ray generator or gamma ray generator, or with UV- and EB- combinations thereof. The atmosphere of the curing station may be of the air, but is preferably of $N_2$, Ar, Xe, He, $CO_2$, $H_2$ or other inert gas atmospheres.

In order to impart to the electrical steel sheet intentionally controlled properties dependent upon the needs and application of the electrical steel sheet, which have been difficult to achieve so long as the insulating film is constructed as consisting of monolayer, it has been found effective to construct the film as consisting of double or more layers of different formulation of the composition. When two or more layers are successively applied on the first layer of an electrical steel sheet, the subbing layer is not always necessary to be cured before the subsequent layer is applied thereon.

For the purpose of giving those skilled in the art a better understanding of the present invention and the manner in which it may be practiced, the following specific examples are given, and they are not intended to be taken as a limitation of the present invention. In these examples, unless otherwise indicated, contents are given in grams.

EXAMPLE 1

An insulating coating composition was made containing;

| | | | |
|---|---|---|---|
| Talc ($Mg_3Si_3O_{11} \cdot H_2O$) | 100 | Acrylated epoxy resin | 300 |
| Iron oxide ($Fe_3O_4$) | 50 | Acrylated polyester resin | 250 |
| Nickel carbonate ($NiCO_3$) | 50 | Hydroxypropyl acrylate | 100 |
| Chromium sulfate ($Cr_2(SO_4)_3$) | 50 | Benzoinisobutyl ether | 4 |

An electrical steel sheet analyzing 0.8% Si content and having a thickness of 0.5 mm was coated with this composition by means of a roll coater at a coverage of 4 microns in thickness. Immediately after that, the thus-coated steel sheet was exposed to UV rays radiating from a high pressure mercury arc lamp (80W/cm) for a period of time of 5 seconds to cure the coating.

EXAMPLE 2

An insulating coating composition was made, containing;

| | | | |
|---|---|---|---|
| Mica ($KAl_3Si_3O_{11} \cdot H_2O$) | 300 | Acrylated epoxy resin | 150 |
| Aluminum phosphate ($Al_2(HPO_4)_3$) | 100 | Acrylated siliconic resin | 150 |
| Calcium sulfate ($CaSO_4$) | 100 | Noepentyl glycol diacrylate | 200 |

An electrical steel sheet analyzing 1.8% Si content and having a thickness of 0.5 mm was coated with this composition by means of a roll coater at a coverage of 8 microns in thickness. Immediately after that, the thus-coated steel sheet was exposed to an electron beam by use of a scanned electron beam system for 2 seconds to cure the coating.

EXAMPLE 3

An insulating coating composition was made, containing;

| | | | |
|---|---|---|---|
| Kaolinite ($Al_2O_3 \cdot 2SiO_2 \cdot 2H_2O$) | 300 | Acrylated epoxy resin | 300 |
| Calcium phosphate ($Ca_3(PO_4)_2$) | 50 | Trimethylolpropane triacrylate | 250 |
| Cobalt sulfate ($CoSO_4$) | 50 | Benzophenone | 2.5 |
| Cupper oxide (CuO) | 50 | Dimethyl amino ethanol | 2.5 |

An electrical steel sheet analyzing 1.8% Si content and having a thickness of 0.5 mm was coated with this composition by means of a roll coater at a coverage of 1 micron in thickness. Immediately after that, the thus-coated steel sheet was exposed to the ultra violet rays for 5 seconds to cure the coating.

EXAMPLE 4

An insulating coating composition was made, containing;

| | | | |
|---|---|---|---|
| Talc | 100 | Acrylated epoxy resin | 300 |
| Magnesium phosphate ($Mg_3(PO_4)_2$) | 100 | Acrylated polyether resin | 200 |
| Paragonite ($NaAl_3Si_3O_{11} \cdot H_2O$) | 100 | Neopentyl glycol diacrylate | 150 |
| Boric acid ($H_3BO_3$) | 50 | Benzoinisobutyl ether | 4 |

An electrical steel sheet analyzing 0.2% Si content and having a thickness of 0.5 mm was coated with this composition by means of a roll coater at a coverage of 1 micron, and then the thus-coated steel sheet was exposed to the ultra violet rays for 5 seconds to cure the coating.

EXAMPLE 5

An insulating coating composition A was made, containing;

| | | | |
|---|---|---|---|
| Mica | 200 | Acrylated polyester resin | 150 |
| Roscollite ($KV_2AlSi_3O_{11} \cdot H_2O$) | 100 | Acrylated siliconic resin | 100 |
| Zinc phosphate ($Zn_3(PO_4)_2$) | 200 | Hydroxypropyl acrylate | 150 |
| Sodium borate ($Na_3BO_3$) | 200 | Benzophenone | 3 |
| | | Dimethyl amino ethanol | 3 |

A second composition B was made, containing;

| | | | |
|---|---|---|---|
| Talc | 100 | Acrylated polyester resin | 250 |
| Magnesium borate | 50 | Hydroxypropyl acrylate | 100 |
| Acrylated epoxy resin | 400 | Benzophenone | 1.5 |
| | | Dimethyl amino ethanol | 1.5 |

An electrical steel sheet analyzing 3.0% Si content and having a thickness of 0.35 mm was coated with the first composition A at a coverage of 5 microns in thickness and then exposed to the ultra violet rays for 2 seconds. After that, the second composition B was applied on the solid insulating film of the first composition A at a coverage of 1 micron in thickness and then exposed to the ultra violet rays for 10 seconds.

EXAMPLE 6

An insulating coating composition was made, containing;

| | | | |
|---|---|---|---|
| Kaolinite | 300 | Acrylated urethanic resin | 150 |
| Gypsum ($CaSO_4 \cdot 2H_2O$) | 150 | Hexanediol diacrylate | 100 |
| Molybdenum oxide ($Mo_2O_5$) | 50 | | |
| Zinc oxide (ZnO) | 50 | | |
| Potassium borate ($K_3BO_3$) | 200 | | |

An electrical steel sheet analyzing 2.3% Si content and having a thickness of 0.5 mm was coated with this composition by means of a roll coater at a coverage of 10 microns in thickness, and then exposed to the electron beam for 4 seconds to cure the coating.

EXAMPLE 7

An insulating coating composition was made, containing;

| | | | |
|---|---|---|---|
| Talc | 300 | Acrylated epoxy resin | 200 |
| Tungsten oxide ($WO_3$) | 25 | Acrylated polyester resin | 150 |
| Stannous phosphate ($SnHPO_4$) | 25 | Acrylated siliconic resin | 50 |
| Magnesium borate ($Mg_3(BO_3)_2$) | 100 | Hexanediol diacrylate | 100 |
| | | Neopentyl glycol diacrylate | 100 |
| | | Benzoinisobutyl ether | 5 |

An electrical steel sheet analyzing 1.5% Si content and having a thickness of 0.5 mm was coated with this composition by means of a roll coater at a coverage of 5 microns in thickness and then exposed to the ultra violet rays for 10 seconds to cure the coating.

EXAMPLE 8

An insulating coating composition was made, containing;

| | | | |
|---|---|---|---|
| Lepidolite ($Li_2Al_2Si_3O_{11} \cdot H_2O$) | 200 | Acrylated epoxy resin | 300 |
| Titanium oxide | 50 | Acrylated polyether resin | 200 |
| Calcium borate | 50 | Hydroxypropyl acrylate | 150 |
| Zinc phosphate | 50 | Benzoinisobutyl ether | 3 |

An electrical steel sheet analyzing 0.8% Si content and having a thickness of 0.5 mm was coated with this composition by means of a roll coater at a coverage of 2 microns in thickness and then exposed to the ultra violet rays for 5 seconds to cure the coating.

EXAMPLE 9

A composition without inorganic compounds was made, containing;

| | |
|---|---|
| Acrylated epoxy resin | 400 |
| Acrylated polyester resin | 400 |
| Neopentyl glycol diacrylate | 200 |
| Benzophenone | 1.5 |
| Dimethylamino ethanol | 1.5 |

An electrical steel sheet analyzing 1.5% Si content and having a thickness of 0.5 mm was coated with this composition at a coverage of 3 microns in thickness and then exposed to the ultra violet rays for 5 seconds to cure the coating.

Various properties of the electrical steel sheets coated in accordance with the Examples 1 through 9 are shown in the following table. It is to be understood that the insulating film of the invention is improved with respect to the stability and interlayer resistance after the stress relief annealing, and also to weldability.

| Ex. | Heat*1 resistance | Punch-*2 ability (×10000) | Interlayer*3 resistance (Ω-cm²/sheet) Before | After | Oil*4 resistance | Corrosion*5 resistance | Ad-*6 hesion |
|---|---|---|---|---|---|---|---|
| 1 | Fair | 130 | 400 | 2 | Good | Good | Good |
| 2 | Good | 160 | 1000< | 8 | " | " | " |
| 3 | " | 120 | 300 | 6 | " | " | Fair |
| 4 | " | 100 | 150 | 1 | " | " | " |
| 5 | " | 180 | 1000< | 10 | " | " | Good |
| 6 | Fair | 180 | 1000< | 11 | " | Fair | Fair |
| 7 | Good | 150 | 800 | 7 | " | Good | Good |
| 8 | Fair | 110 | 300 | 5 | " | " | " |
| 9 | Poor | 100 | 400 | 0 | " | " | Fair |

Note:
*1The heat resistance is estimated by the peel-off test after 3 hours' heating at 760° C. in a nitrogen gas atmosphere. Good: no peeled-off area; Fair: less than 20% peeled off area; Poor: more than 50%.
*2The punchability is estimated by the number of repeats of punching operation necessary to produce a Burr Height of up to 50 microns.
*3The interlayer resistance before and after the stress relief anneal is estimated according to JIS C2550.
*4The oil resistance is estimated by the degree of change in quality after 24 hours' immersion in an insulating oil at 150° C. Good: no change.
*5The corrosion resistance is estimated by the humidity test at 50° C. under a relative humidity of 98% for 24 hours. Good: less than 0.1% rust is formed; Fair: 0.1 to 5% rust.
*6The strength of adhesion is estimated by the 180° bending test using a bar with a diameter of 10 mm. The criterion is the same as that in the heat resistance test.

What is claimed is:

1. An electrical steel sheet coated with an insulating coating film said film having a thickness less than 10 microns and comprising 40 to 70 percent by weight of an organic polymeric material curable by ultraviolet rays or electron beam and 30 to 60 percent by weight of an inorganic compound selected from the group consisting of silicates having a hardness in Mohs scale of not higher than 5 and 1 to 50 percent by weight based on the total weight of the inorganic compound of a compound selected from the group consisting of boric acids and borates.

2. The electrical steel sheet of claim 1 wherein said organic polymeric material is curable by electron beam and includes at least one compound selected from the group consisting of acrylated epoxy resins, acrylated polyether resins, acrylated polyester resins, acrylated siliconic resins and acrylated urethanic resins.

3. The electrical steel sheet of claim 1 wherein said organic polymeric material is curable by ultraviolet and includes at least one compound selected from the group consisting of acrylated epoxy resins, acrylated polyether resins, acrylated polyester resins, acrylated siliconic resins and acrylated urethanic resins with a photo-initiator.

4. The electrical steel sheet of claim 1 wherein said film consists of a single layer having a thickness of less than 10 microns.

5. The electrical steel sheet of claim 1 wherein said film consists of two or more layers superimposed one upon another with a total thickness of less than 10 microns.

6. The electrical steel sheet of claim 5 wherein said insulating film is applied to said electrical steel sheet after a continuous annealing operation in a continuous manner on the same line as that of the production of said electrical sheet, and then is subjected to an ultraviolet ray or electron beam curing operation.

* * * * *